United States Patent [19]
Nicholson

[11] 3,918,774
[45] Nov. 11, 1975

[54] BOWED ROLL
[75] Inventor: Charles B. Nicholson, Glens Falls, N.Y.
[73] Assignee: Albany International Corporation, Albany, N.Y.
[22] Filed: Nov. 7, 1973
[21] Appl. No.: 413,531

[52] U.S. Cl. .............. 308/187; 308/20; 198/192 A
[51] Int. Cl.² ........................................ F16C 33/76
[58] Field of Search .......... 308/18, 20, 92, 93, 101, 308/182, 187, 188, 190; 193/37; 198/192 R, 192 A

[56] References Cited
UNITED STATES PATENTS
1,278,060   9/1918   Swenson ............................ 308/190
2,582,280   1/1952   Robertson .......................... 198/192

FOREIGN PATENTS OR APPLICATIONS
933,541   9/1955   Germany ........................... 308/190

Primary Examiner—Evon C. Blunk
Assistant Examiner—Robert Saifer

[57] ABSTRACT

A bowed roll is provided comprising an elongated shaft, a series of spools disposed about the shaft for rotation and a plurality of bearings disposed along the shaft. Each of the bearings has an inner race in contact with the shaft and an outer race in contact with one of the spools. The bearings are maintained in position by a plurality of elongated tubular spacers disposed about the shaft with each of the spacers being positioned between a pair of bearings. Each of the spacers is longitudinally split and has its opposite ends tapered and abutting against surfaces of the side walls of the inner races of the pair of bearings which are complementarily tapered.

2 Claims, 4 Drawing Figures

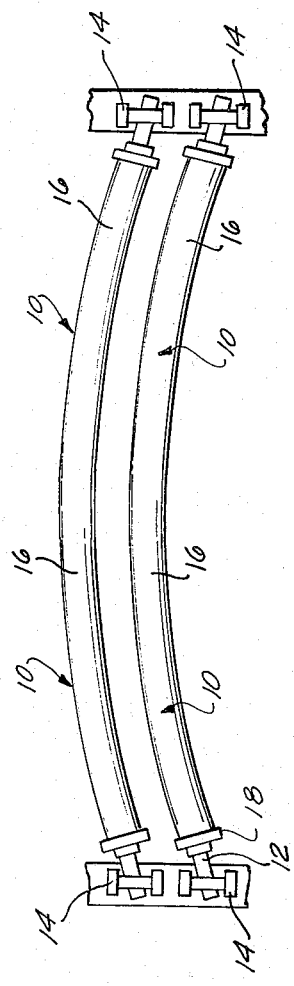
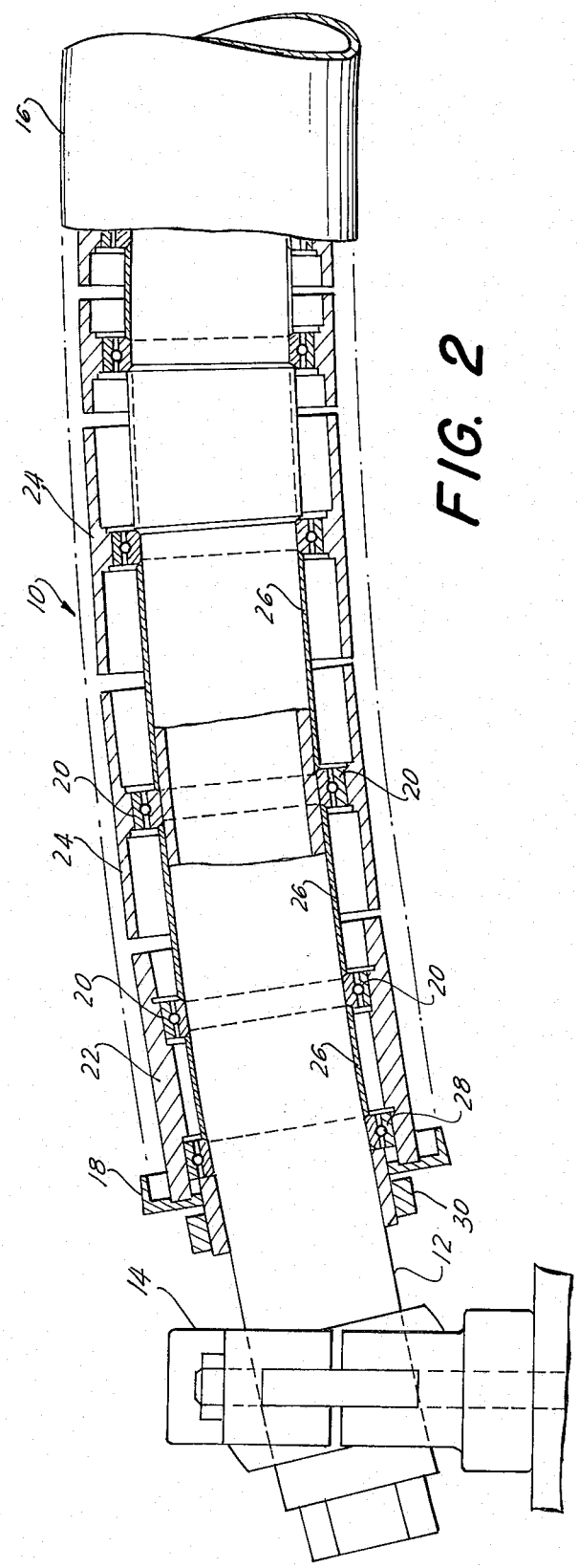

BOWED ROLL

BACKGROUND OF THE INVENTION

The present invention relates to rolls and in particular to a bowed roll provided with improved means to properly space the bearings and lock them in position.

Bowed rolls are extensively used in the paper and textile industries, as for example in the conveyors with which these materials are handled and moved. The rolls comprise a curved sleeve supported by a series of spools which, in turn, are supported by bearings to rotate about a shaft. A problem encountered in the design and construction of such rolls involves the proper placement of the bearings along the curved shaft to properly support the spools and to prevent their shifting position during operation. Heretofore, it has been necessary to lock the bearings in place utilizing set screws or the like and to precisely fit the bearings about the shaft in order to prevent longitudinal shifting along the shaft or radial shifting. The fitting and placement of the bearings thus posed problems in assembling the rolls.

In view of the above, it is the principal object of the present invention to provide an improved bowed roll wherein means are provided to properly position and lock the bearings in place to adequately support a series of spools to maintain the desired curvature of the roll.

A further object is to provide a means whereby dimensional differences between the shaft and bearing inner diameter may be tolerated.

SUMMARY OF THE INVENTION

The above and other beneficial objects and advantages are attained in the present invention by providing a bowed roll comprising an elongated, curved shaft having a series of spools disposed about the shaft for rotation. A plurality of bearings are disposed along the shaft, each of the bearings having an inner race in contact with the shaft and an outer race in contact with one of the spools. The end bearings are prevented from shifting apart by associated thrust collars. A plurality of elongated tubular spacers is disposed about the shaft, each of the spacers being positioned between a pair of bearings. Each of the spacers is split along its entire length and has portions at its opposite ends tapered and abutting surfaces of the side walls of the inner races of the pair of bearings. The side walls of the bearing inner races are tapered at an angle complementary to the angle of the spacer ends so as to insure a snug fit between each bearing and spacer. In this manner, the bearings are locked in position and prevented from moving relative to one another. In a successful practice of the invention, the spool ends and bearing inner race side walls were both tapered at a 45° angle.

BRIEF DESCRIPTION OF THE DRAWINGS

In the accompanying drawings:

FIG. 1 is a top plan environmental view of a bowed roll in accordance with the present invention;

FIG. 2 is an enlarged fragmentary side elevational view of one of the bowed rolls, shown partly in section;

DETAILED DESCRIPTION OF THE PREFERRED EMBODIMENT

Figure 3:
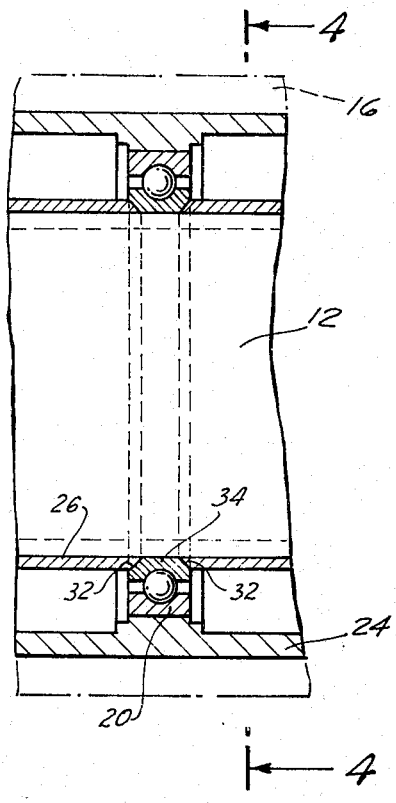
FIG. 3 is an enlarged fragmentary side elevational sectional view depicting the positioning of a bearing between a pair of spacers.
Figure 4:
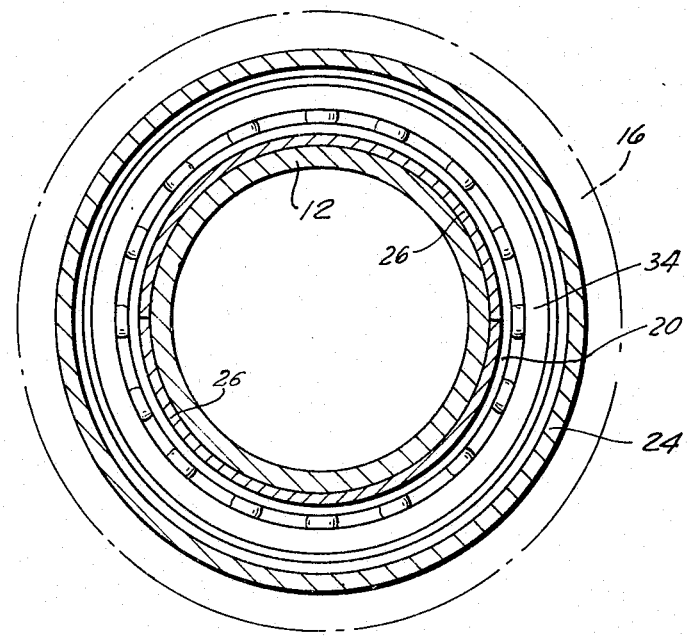
FIG. 4 is a sectional view taken along reference line 4—4 of FIG. 3 in the direction indicated by the arrows wherein the bearing retainer plates have been removed for clarity.

The present invention is illustrated in the accompanying drawings wherein similar components bear the same reference numerals throughout the several views. In FIG. 1 there is shown a plurality of bowed rolls 10 as are commonly used in the textile and paper industries. The rolls 10 each comprise a curved shaft 12 supported at its ends by a journal support 14.

A sleeve 16 substantially coextensive with the shaft is disposed about the shaft and held in position by an end cap 18 which in turn is supported for rotation with spool 22 which is keyed to the cap. A plurality of additional spools 24 is spaced along the shaft each supported by a bearing 20 and in turn helping to support the sleeve 16. In operation, traveling textile or paper passes over the sleeve causing the sleeve and hence the spools to rotate about the shaft.

It is essential to the proper operation of the bowed roll that the spools be properly positioned and that they do not alter their position in operation by shifting longitudinally or radially. In accordance with the present invention, this is attained by providing a plurality of longitudinally split tubular spacers 26 along the shaft. Each of the spacers 26 is positioned between a pair of adjacent bearings and, similarly, each of the bearings 20 is positioned between a pair of adjacent spacers 26. The end bearings 28 are held in position by a thrust collar 30 and thus prevented from moving longitudinally apart along the shaft. On long shafts, the shaft may be divided into sections with thrust collars 30 at the end of each section. The spacers 26 serve to prevent the movement of the bearings between the end bearings and also prevent the movement of the end bearings toward each other. In addition, the spacers serve to allow a bearing with an oversized inner diameter to fit snugly on a shaft by riding upward on the taper until any dimensional difference between the shaft and bearing inner diameter is taken up. In this manner the concentricity of the shaft and spacer is maintained.

Referring to FIG. 3, it can be seen that the ends 32 of each spacer 26 taper downwardly. That is, the overall length of the spacer measured immediately adjacent the shaft is greater than the overall length measured closer to the spool. The angle of the taper in a successful practice of the invention was 45°. Surfaces defining a complementary taper are provided on the side walls of the inner race 34 of each of the bearings 20. Thus, the bearings mate against the spacers and are locked in place by the complementary wedges of the spacer and bearing tapers. As shown, the plurality of spacers 26 and bearings extend substantially over the entire shaft length. The thrust bearing 30 prevents longitudinal movement along the shaft of the end spacer and thus each of the bearings and spacers is locked in position and prevented from shifting along the shaft during operation of the roll.

Thus, in accordance with the above, the aforementioned objects are effectively attained.

Having thus described the invention, what is claimed is:

1. In a bowed roll of the type having an elongated curved shaft having opposed ends, a plurality of spools spaced along said shaft and disposed thereabout and a plurality of bearings spaced along said shaft, each of said bearings having an inner race disposed about said shaft and an outer race supporting one of said spools, the improvement comprising: means for preventing the further longitudinal separation of the bearings closest said opposed ends and a plurality of longitudinally split tubular spacers disposed about said shaft, each of said spacers having an inner diameter disposed about said shaft, an outer diameter, and the length of said spacer measured along said inner diameter being greater than the length measured along said outer diameter, each of said spacers being unattached to said shaft and positioned between a pair of adjacent bearings and having end portions abutting surfaces of the inner races of a pair of adjacent bearings wherein each of said spacer end portions is tapered and the surfaces of the inner races of the adjacent pair of bearings is tapered at a complementary angle to mate with the spacer tapered ends whereby to take up any dimensional differences between said bearing inner race and shaft and locate and hold the bearing concentric to the shaft and to urge each of said spacers against said shaft for frictional engagement therewith.

2. The bowed roll in accordance with claim 1 wherein said spacer end portions and bearing inner race surfaces are each tapered at an angle of substantially 45°.

* * * * *